(12) United States Patent
Ide

(10) Patent No.: US 7,149,404 B2
(45) Date of Patent: Dec. 12, 2006

(54) LASER DIODE MODULE

(75) Inventor: Masafumi Ide, Tokorozawa (JP)

(73) Assignee: Citizen Watch Co., Ltd., Tokyo (JP)

( * ) Notice: Subject to any disclaimer, the term of this patent is extended or adjusted under 35 U.S.C. 154(b) by 0 days.

(21) Appl. No.: 11/059,363

(22) Filed: Feb. 17, 2005

(65) Prior Publication Data

US 2005/0180717 A1    Aug. 18, 2005

(30) Foreign Application Priority Data

Feb. 17, 2004    (JP)    ............... 2004-040500

(51) Int. Cl.
*G02B 6/00*    (2006.01)
(52) U.S. Cl. ........................... 385/140; 385/134
(58) Field of Classification Search ............ 385/134, 385/140
See application file for complete search history.

(56) References Cited

U.S. PATENT DOCUMENTS 6,563,846 B1    5/2003    Kuo et al.

2005/0135773 A1*    6/2005    McDonald ............ 385/140

FOREIGN PATENT DOCUMENTS

| JP | 07-301734 A | 11/1995 |
|---|---|---|
| JP | 11-052339 A | 2/1999 |
| JP | 2001-013477 A | 1/2001 |

* cited by examiner

*Primary Examiner*—Jennifer Doan
(74) *Attorney, Agent, or Firm*—Sughrue Mion, PLLC

(57) ABSTRACT

A laser diode that emits light of a predetermined wavelength, an optical fiber that propagates the light emitted from the laser diode, and a transmission liquid crystal variable optical attenuator that is arranged on an optical axis of the light between the laser diode and the optical fiber and attenuates light intensity of the light are arranged inside a housing. A coupling lens couples the light emitted from the laser diode to an incidence end of the optical fiber. An isolator prevents return light from the optical fiber side.

15 Claims, 13 Drawing Sheets

FIG.6A

| | LIGHT SOURCE a | b | c | d | e | f | g |
|---|---|---|---|---|---|---|---|
| A { | LD | COUPLING LENS | (POLARIZATION DEPENDENT) ISOLATOR | LIQUID CRYSTAL CELL | ABSORPTION POLARIZING PLATE (E.G., POLARCORE) | SINGLE MODE OPTICAL FIBER (SMF) | — |
| | LD | COUPLING LENS | (POLARIZATION DEPENDENT) ISOLATOR | LIQUID CRYSTAL CELL | ABSORPTION POLARIZING PLATE (E.G., POLARCORE) | POLARIZATION-MAINTAINING SINGLE MODE OPTICAL FIBER(PMF) | — |
| B { | LD | — | (POLARIZATION DEPENDENT) ISOLATOR | LIQUID CRYSTAL CELL | ABSORPTION POLARIZING PLATE (E.G., POLARCORE) | FIBER COLLIMATOR (LENS) | SMF |
| | LD | — | (POLARIZATION DEPENDENT) ISOLATOR | LIQUID CRYSTAL CELL | ABSORPTION POLARIZING PLATE (E.G., POLARCORE) | FIBER COLLIMATOR (LENS) | PMF |
| C { | LD | COUPLING LENS | (POLARIZATION DEPENDENT) ISOLATOR | LIQUID CRYSTAL CELL | ABSORPTION POLARIZING PLATE (E.G., POLARCORE) | LENS | SMF |
| | LD | COUPLING LENS | (POLARIZATION DEPENDENT) ISOLATOR | LIQUID CRYSTAL CELL | ABSORPTION POLARIZING PLATE (E.G., POLARCORE) | LENS | PMF |
| D { | LD | COUPLING LENS | (POLARIZATION DEPENDENT) ISOLATOR | LIQUID CRYSTAL CELL | REFLECTION POLARIZING PLATE (E.G., PHOTONIC LATTICE) | SINGLE MODE OPTICAL FIBER (SMF) | — |
| | LD | COUPLING LENS | (POLARIZATION DEPENDENT) ISOLATOR | LIQUID CRYSTAL CELL | REFLECTION POLARIZING PLATE (E.G., PHOTONIC LATTICE) | POLARIZATION-MAINTAINING SINGLE MODE OPTICAL FIBER(PMF) | — |
| E { | LD | — | (POLARIZATION DEPENDENT) ISOLATOR | LIQUID CRYSTAL CELL | REFLECTION POLARIZING PLATE (E.G., PHOTONIC LATTICE) | FIBER COLLIMATOR (LENS) | SMF |
| | LD | — | (POLARIZATION DEPENDENT) ISOLATOR | LIQUID CRYSTAL CELL | REFLECTION POLARIZING PLATE (E.G., PHOTONIC LATTICE) | FIBER COLLIMATOR (LENS) | PMF |
| | LD | COUPLING LENS | (POLARIZATION DEPENDENT) ISOLATOR | LIQUID CRYSTAL CELL | REFLECTION POLARIZING PLATE (E.G., PHOTONIC LATTICE) | LENS | SMF |
| | LD | COUPLING LENS | (POLARIZATION DEPENDENT) ISOLATOR | LIQUID CRYSTAL CELL | REFLECTION POLARIZING PLATE (E.G., PHOTONIC LATTICE) | LENS | PMF |

FIG.6C

| | | | | | |
|---|---|---|---|---|---|
| LD | COUPLING LENS | LIQUID CRYSTAL CELL | ABSORPTION POLARIZING PLATE (E.G., POLARCORE) | (POLARIZATION DEPENDENT) ISOLATOR | LENS | SMF |
| LD | COUPLING LENS | LIQUID CRYSTAL CELL | ABSORPTION POLARIZING PLATE (E.G., POLARCORE) | (POLARIZATION DEPENDENT) ISOLATOR | LENS | PMF |
| LD | COUPLING LENS | LIQUID CRYSTAL CELL | REFLECTION POLARIZING PLATE (E.G., PHOTONIC LATTICE) | (POLARIZATION DEPENDENT) ISOLATOR | LENS | SMF |
| LD | COUPLING LENS | LIQUID CRYSTAL CELL | REFLECTION POLARIZING PLATE (E.G., PHOTONIC LATTICE) | (POLARIZATION DEPENDENT) ISOLATOR | LENS | PMF |

| LD | — | LIQUID CRYSTAL CELL | ABSORPTION POLARIZING PLATE (E.G., PHOTONIC LATTICE) | (POLARIZATION DEPENDENT) ISOLATOR | FIBER COLLIMATOR (LENS) | SMF |
| --- | --- | --- | --- | --- | --- | --- |
| LD | — | LIQUID CRYSTAL CELL | ABSORPTION POLARIZING PLATE (E.G., PHOTONIC LATTICE) | (POLARIZATION DEPENDENT) ISOLATOR | FIBER COLLIMATOR (LENS) | PMF |
| LD | — | LIQUID CRYSTAL CELL | REFLECTION POLARIZING PLATE (E.G., PHOTONIC LATTICE) | (POLARIZATION DEPENDENT) ISOLATOR | FIBER COLLIMATOR (LENS) | SMF |
| LD | — | LIQUID CRYSTAL CELL | REFLECTION POLARIZING PLATE (E.G., PHOTONIC LATTICE) | (POLARIZATION DEPENDENT) ISOLATOR | FIBER COLLIMATOR (LENS) | PMF |

| | LIGHT SOURCE a | b | c | d | e | f | g |
|---|---|---|---|---|---|---|---|
| I { | VCSEL | (COUPLING LENS) | (POLARIZATION DEPENDENT) ISOLATOR | LIQUID CRYSTAL CELL | ABSORPTION POLARIZING PLATE (E.G., POLARCORE) | SINGLE MODE OPTICAL FIBER (SMF) | — |
| | VCSEL | (COUPLING LENS) | (POLARIZATION DEPENDENT) ISOLATOR | LIQUID CRYSTAL CELL | ABSORPTION POLARIZING PLATE (E.G., POLARCORE) | POLARIZATION-MAINTAINING SINGLE MODE OPTICAL FIBER(PMF) | — |
| J { | VCSEL | (COUPLING LENS) | (POLARIZATION DEPENDENT) ISOLATOR | LIQUID CRYSTAL CELL | ABSORPTION POLARIZING PLATE (E.G., POLARCORE) | FIBER COLLIMATOR (LENS) | SMF |
| K { | VCSEL | (COUPLING LENS) | (POLARIZATION DEPENDENT) ISOLATOR | LIQUID CRYSTAL CELL | ABSORPTION POLARIZING PLATE (E.G., POLARCORE) | FIBER COLLIMATOR (LENS) | PMF |
| | VCSEL | (COUPLING LENS) | (POLARIZATION DEPENDENT) ISOLATOR | LIQUID CRYSTAL CELL | ABSORPTION POLARIZING PLATE (E.G., POLARCORE) | LENS | SMF |
| | VCSEL | (COUPLING LENS) | (POLARIZATION DEPENDENT) ISOLATOR | LIQUID CRYSTAL CELL | ABSORPTION POLARIZING PLATE (E.G., POLARCORE) | LENS | PMF |
| L { | VCSEL | (COUPLING LENS) | (POLARIZATION DEPENDENT) ISOLATOR | LIQUID CRYSTAL CELL | REFLECTION POLARIZING PLATE (E.G., PHOTONIC LATTICE) | SINGLE MODE OPTICAL FIBER (SMF) | — |
| | VCSEL | (COUPLING LENS) | (POLARIZATION DEPENDENT) ISOLATOR | LIQUID CRYSTAL CELL | REFLECTION POLARIZING PLATE (E.G., PHOTONIC LATTICE) | POLARIZATION-MAINTAINING SINGLE MODE OPTICAL FIBER(PMF) | — |
| M { | VCSEL | (COUPLING LENS) | (POLARIZATION DEPENDENT) ISOLATOR | LIQUID CRYSTAL CELL | REFLECTION POLARIZING PLATE (E.G., PHOTONIC LATTICE) | FIBER COLLIMATOR (LENS) | SMF |
| | VCSEL | (COUPLING LENS) | (POLARIZATION DEPENDENT) ISOLATOR | LIQUID CRYSTAL CELL | REFLECTION POLARIZING PLATE (E.G., PHOTONIC LATTICE) | FIBER COLLIMATOR (LENS) | PMF |
| | VCSEL | (COUPLING LENS) | (POLARIZATION DEPENDENT) ISOLATOR | LIQUID CRYSTAL CELL | REFLECTION POLARIZING PLATE (E.G., PHOTONIC LATTICE) | LENS | SMF |
| | VCSEL | (COUPLING LENS) | (POLARIZATION DEPENDENT) ISOLATOR | LIQUID CRYSTAL CELL | REFLECTION POLARIZING PLATE (E.G., PHOTONIC LATTICE) | LENS | PMF |

FIG.7B

| | | | | | |
|---|---|---|---|---|---|
| N { | VCSEL | (COUPLING LENS) | ABSORPTION OR REFLECTION POLARIZING PLATE | LIQUID CRYSTAL CELL | ABSORPTION POLARIZING PLATE (E.G., POLARCORE) | SINGLE MODE OPTICAL FIBER (SMF) | — |
| | VCSEL | (COUPLING LENS) | ABSORPTION OR REFLECTION POLARIZING PLATE | LIQUID CRYSTAL CELL | ABSORPTION POLARIZING PLATE (E.G., POLARCORE) | POLARIZATION-MAINTAINING SINGLE MODE OPTICAL FIBER(PMF) | — |
| | VCSEL | (COUPLING LENS) | ABSORPTION OR REFLECTION POLARIZING PLATE | LIQUID CRYSTAL CELL | ABSORPTION POLARIZING PLATE (E.G., POLARCORE) | FIBER COLLIMATOR (LENS) | SMF |
| | VCSEL | (COUPLING LENS) | ABSORPTION OR REFLECTION POLARIZING PLATE | LIQUID CRYSTAL CELL | ABSORPTION POLARIZING PLATE (E.G., POLARCORE) | FIBER COLLIMATOR (LENS) | PMF |
| | VCSEL | (COUPLING LENS) | ABSORPTION OR REFLECTION POLARIZING PLATE | LIQUID CRYSTAL CELL | ABSORPTION POLARIZING PLATE (E.G., POLARCORE) | LENS | SMF |
| | VCSEL | (COUPLING LENS) | ABSORPTION OR REFLECTION POLARIZING PLATE | LIQUID CRYSTAL CELL | ABSORPTION POLARIZING PLATE (E.G., POLARCORE) | LENS | PMF |
| O { | VCSEL | (COUPLING LENS) | ABSORPTION OR REFLECTION POLARIZING PLATE | LIQUID CRYSTAL CELL | REFLECTION POLARIZING PLATE (E.G., PHOTONIC LATTICE) | SINGLE MODE OPTICAL FIBER (SMF) | — |
| | VCSEL | (COUPLING LENS) | ABSORPTION OR REFLECTION POLARIZING PLATE | LIQUID CRYSTAL CELL | REFLECTION POLARIZING PLATE (E.G., PHOTONIC LATTICE) | POLARIZATION-MAINTAINING SINGLE MODE OPTICAL FIBER(PMF) | — |
| | VCSEL | (COUPLING LENS) | ABSORPTION OR REFLECTION POLARIZING PLATE | LIQUID CRYSTAL CELL | REFLECTION POLARIZING PLATE (E.G., PHOTONIC LATTICE) | FIBER COLLIMATOR (LENS) | SMF |
| | VCSEL | (COUPLING LENS) | ABSORPTION OR REFLECTION POLARIZING PLATE | LIQUID CRYSTAL CELL | REFLECTION POLARIZING PLATE (E.G., PHOTONIC LATTICE) | FIBER COLLIMATOR (LENS) | PMF |
| | VCSEL | (COUPLING LENS) | ABSORPTION OR REFLECTION POLARIZING PLATE | LIQUID CRYSTAL CELL | REFLECTION POLARIZING PLATE (E.G., PHOTONIC LATTICE) | LENS | SMF |
| | VCSEL | (COUPLING LENS) | ABSORPTION OR REFLECTION POLARIZING PLATE | LIQUID CRYSTAL CELL | REFLECTION POLARIZING PLATE (E.G., PHOTONIC LATTICE) | LENS | PMF |

FIG.7C

| P | | | | | |
|---|---|---|---|---|---|
| VCSEL | (COUPLING LENS) | (ABSORPTION OR REFLECTION POLARIZING PLATE) | LIQUID CRYSTAL CELL | ABSORPTION POLARIZING PLATE (E.G., POLARCORE) | MULTI-MODE FIBER | — |
| VCSEL | (COUPLING LENS) | (ABSORPTION OR REFLECTION POLARIZING PLATE) | LIQUID CRYSTAL CELL | ABSORPTION POLARIZING PLATE (E.G., POLARCORE) | FIBER COLLIMATOR (LENS) | MULTI-MODE FIBER |
| VCSEL | (COUPLING LENS) | (ABSORPTION OR REFLECTION POLARIZING PLATE) | LIQUID CRYSTAL CELL | ABSORPTION POLARIZING PLATE (E.G., POLARCORE) | LENS | MULTI-MODE FIBER |
| VCSEL | (COUPLING LENS) | (ABSORPTION OR REFLECTION POLARIZING PLATE) | LIQUID CRYSTAL CELL | REFLECTION POLARIZING PLATE (E.G., PHOTONIC LATTICE) | MULTI-MODE FIBER | — |
| VCSEL | (COUPLING LENS) | (ABSORPTION OR REFLECTION POLARIZING PLATE) | LIQUID CRYSTAL CELL | REFLECTION POLARIZING PLATE (E.G., PHOTONIC LATTICE) | FIBER COLLIMATOR (LENS) | MULTI-MODE FIBER |
| VCSEL | (COUPLING LENS) | (ABSORPTION OR REFLECTION POLARIZING PLATE) | LIQUID CRYSTAL CELL | REFLECTION POLARIZING PLATE (E.G., PHOTONIC LATTICE) | LENS | MULTI-MODE FIBER |

FIG.7D

| VCSEL | — | (ABSORPTION OR REFLECTION POLARIZING PLATE) | LIQUID CRYSTAL CELL | ABSORPTION POLARIZING PLATE (E.G., POLARCORE) | — | MULTI-MODE FIBER |
|---|---|---|---|---|---|---|
| VCSEL | — | (ABSORPTION OR REFLECTION POLARIZING PLATE) | LIQUID CRYSTAL CELL | REFLECTION POLARIZING PLATE (E.G., PHOTONIC LATTICE) | — | MULTI-MODE FIBER |

LASER DIODE MODULE

BACKGROUND OF THE INVENTION

1) Field of the Invention

The present invention relates to a laser diode module that can vary output light intensity, and in particular to such a laser diode module that can be reduced in size with a simple structure.

2) Description of the Related Art

A laser diode (LD) module includes a laser diode, a temperature regulating member like a Peltier element, a coupling lens, and an isolator that are incorporated in a housing (see, for example, Japanese Patent Application Laid-Open No. H7-301734). In recent years, an increase in capacity and an increase in speed have been promoted for optical communication. The LD module is used as light sources for respective channels of Wavelength Division Multiplexing (WDM) in the optical communication.

Such a LD module provided in each of the channels in the WDM communication is required to adjust output light intensity for each of the channels. Conventionally, a variable optical attenuator (VOA), which is externally attached to the LD module, has been used for adjustment of light intensity of light outputted from the LD module (see, for example, Japanese Patent Application Laid-Open No. 2001-13477 and Japanese Patent Application Laid-Open No. H11-52339). The VOA described in Japanese Patent Application Laid-Open No. 2001-13477 is a single VOA using liquid crystals. The VOA described in Japanese Patent Application Laid-Open No. H11-52339 is a VOA in which a polymer dispersed liquid crystal layer is inserted between fibers. Besides, a method of adjusting output light intensity using both control for a bias current supplied to a LD and control for laser chip temperature has also been proposed (see, for example, U.S. Pat. No. 6,563,846).

FIG. 11 is a diagram of a structure for adjusting output light intensity in a conventional technique. The structure shown in the figure is for one channel in the WDM communication. As shown in the figure, output light of an LD module 100 is connected to a VOA module via an optical fiber 101 and is made incident on an optical fiber 103 of a single mode (SM) or the like with output light intensity thereof adjusted by a VOA 102.

However, for example, if the VOA 102 of the structure described in Japanese Patent Application Laid-Open No. 2001-13477 is externally attached to the LD module 100, problems like an increase in loss due to insertion of the VOA 102, an increase in cost due to an increase of the number of components or the like, and time and labor required for adjustment are caused. There is also a problem of an increase in an installation area due to the external attachment.

For example, in the structure shown in FIG. 11, when emitted light from the LD module 100 due to linear polarization is made incident on the optical fiber 101 once, optical systems 110a, 110b, and 110c like a lens or a polarizer for aligning polarization states between the LD module 100 and the optical fiber 101 are required on an emission side of the LD module 100 and an incidence side of the VOA module 102. Light emitted from the LD module 100 is linear polarized light. When this light is made incident on the optical fiber 101 once, since a polarization characteristic of the optical fiber 101 is not always identical with that of the VOA 102, an optical system or the like for making the light made incident on the VOA 102 independent of polarization is required.

In the structure described in Japanese Patent Application Laid-Open No. H11-52339, it is necessary to increase a thickness of a liquid crystal layer in the polymer dispersed liquid crystal layer to obtain a sufficient amount of attenuation. Thus, there is a problem in that a high voltage is required and hysteresis occurs, making it impossible to obtain an accurate amount of attenuation.

A method of adjusting output light intensity of a laser module by controlling a bias current of a LD has also been proposed. However, a wavelength of output light is shifted simply by controlling the bias current. Thus, in particular, when the method is applied to an LD module based on a frequency grid of ITU-T of Dense Wavelength Division Multiplexing (DWDM), there is a problem in that the light with the shifted wavelength deviates from a frequency grid set for each short frequency interval.

In the method described in U.S. Pat. No. 6,563,846, there is a problem in that control for a bias current supplied to the LD and a laser chip temperature is complicated.

SUMMARY OF THE INVENTION

It is an object of the present invention to at least solve the problems in the conventional technology.

The laser diode according to an aspect of the present invention includes a laser diode that emits light of a predetermined wavelength; a liquid crystal variable optical attenuator that attenuates intensity of the light emitted; and an optical fiber that propagates the light attenuated. The liquid crystal variable optical attenuator is arranged on an optical axis of the light and between the laser diode and the optical fiber.

The other objects, features, and advantages of the present invention are specifically set forth in or will become apparent from the following detailed description of the invention when read in conjunction with the accompanying drawings.

The other objects, features, and advantages of the present invention are specifically set forth in or will become apparent from the following detailed description of the invention when read in conjunction with the accompanying drawings.

BRIEF DESCRIPTION OF THE DRAWINGS

FIG. 4 is a diagram of a traveling state of light when the transmission VOA is ON;

FIG. 6A is a table of examples of a structure of the LD module;

FIG. 6C is a table of still other examples of a structure of the LD module;

FIG. 6D is a table of examples of a structure of the LD module;

FIG. 7A is a table of examples of another structure of the LD module;

FIG. 7B is a table of other examples of another structure of the LD module;

FIG. 7C is a table of still other examples of another structure of the LD module;

FIG. 7D is a table of still other examples of another structure of the LD module;

DETAILED DESCRIPTION

Exemplary embodiments of a laser diode (LD) module according to the present invention will be hereinafter explained in detail with reference to the accompanying drawings.

Figure 1:
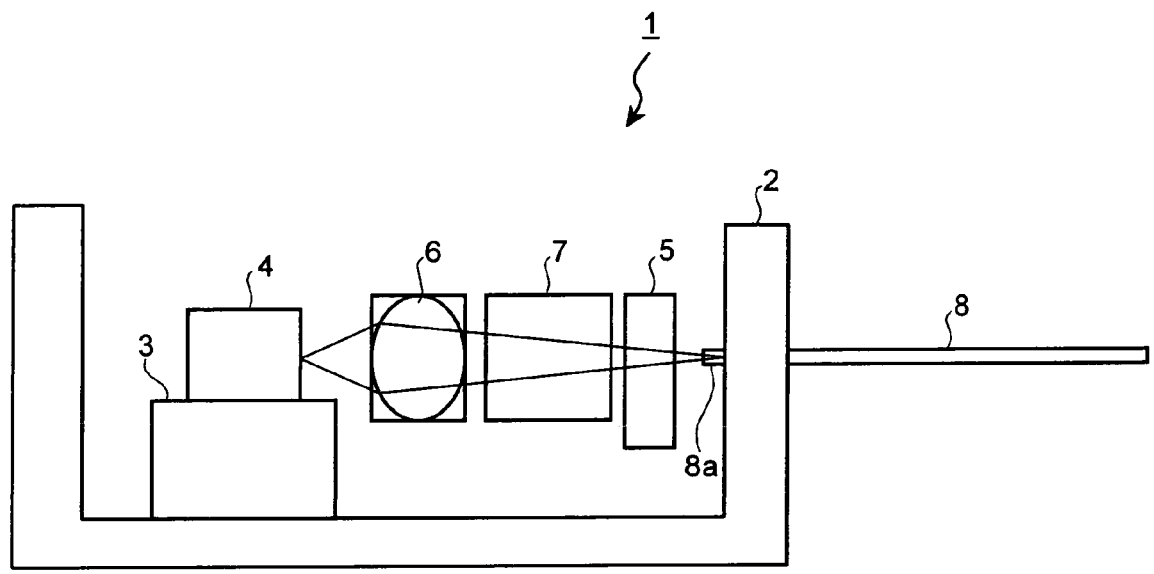
FIG. 1 is a side sectional view of a laser diode (LD) module according to the present invention.

FIG. 1 is a side sectional view of an LD module 1 according to the invention. An LD (an LD chip) 4 is mounted on a temperature regulating member 3 like a Peltier element in a housing 2. This LD 4 is subjected to light intensity stabilization control for light detected by a not-shown light-receiving element (PD) such that a frequency of output light is stabilized and is subjected to temperature regulation control by the temperature regulating member 3 to have constant temperature.

An incidence end 8a of an optical fiber 8 is positioned and fixed on an optical axis of light emitted from the LD 4. A liquid crystal variable optical attenuator (hereinafter, "transmission VOA") 5 is arranged on the optical axis between the LD 4 and the optical fiber 8. In an example of a structure shown in FIG. 1, a coupling lens 6 for coupling and an isolator 7 for preventing return light to the LD 4 are provided on the optical axis of the emitted light in order from the LD 4 side. The transmission VOA 5 is arranged between the isolator 7 and the optical fiber 8. The isolator 7 is polarization dependent. On the optical axis of the example of the structure shown in FIG. 1, light emitted from the LD 4 and diffused is converged at the incidence end 8a of the optical fiber 8 and made incident on the optical fiber 8 by the coupling lens 6.

Figure 2:
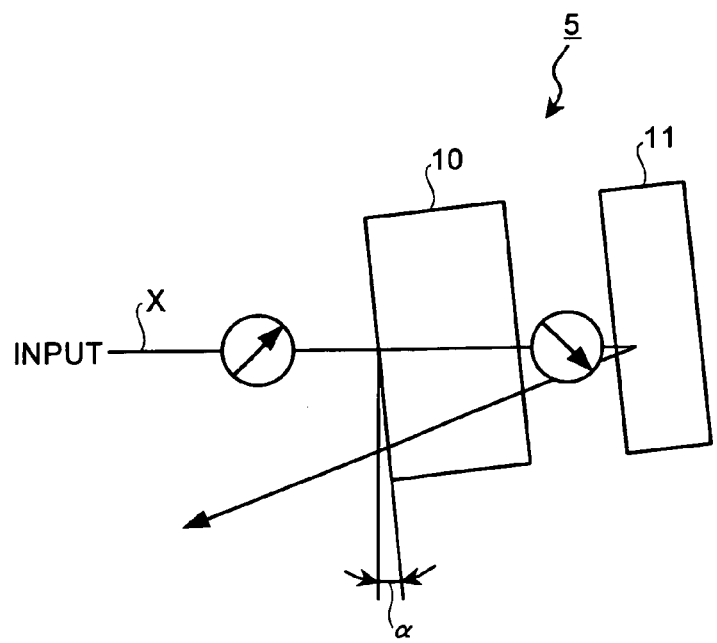
FIG. 2 is a side view of a transmission VOA.

FIG. 2 is a side view of the transmission VOA 5 and shows a traveling state of light when the transmission VOA 5 is OFF. The transmission VOA 5 includes a liquid crystal cell 10 and a polarizing plate 11 that is arranged on the back (a light emission side) of the liquid crystal cell 10. In the structure shown in the figure, the liquid crystal cell 10 and the polarizing plate 11 are spaced apart from each other to explain a light polarizing direction. However, the polarizing plate 11 can be adhered to the back (the light emission side) of the liquid crystal cell 10. The polarizing plate 11 is a reflection polarizing plate. The liquid crystal cell 10 and the polarizing plate 11 are provided at an offset angle α slightly inclined with respect to an optical axis X of emitted light.

Next, an operation of the transmission VOA 5 will be explained. Polarized light emitted from the LD 4 shown in FIG. 1 is made incident on the transmission VOA 5 at a polarization angle of 45° by the isolator 7 (light polarizing directions are shown in circles in the figure).

Figure 3:
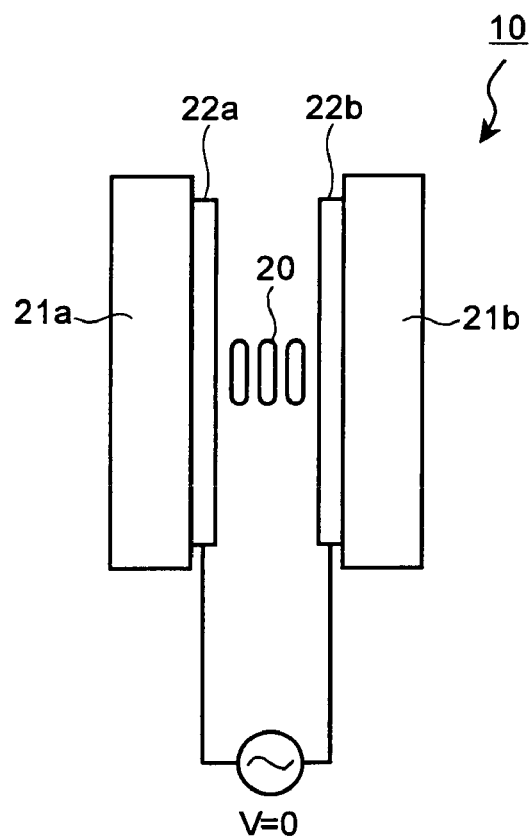
FIG. 3 is a diagram of an arrangement state of liquid crystals when a voltage is not applied.

FIG. 3 is a diagram showing an arrangement state of liquid crystals when a voltage is not applied. It is assumed that the liquid crystals form a homogeneous (parallel orientation) nematic layer without twist in a molecule arrangement. Liquid crystals 20 are arranged to be sandwiched by two glass plates 21a and 21b. On inner sides of the pair of glass plates 21a and 21b, transparent electrodes 22a and 22b including metal oxide like ITO (e.g., an ITO film of indium oxide added with tin (Sn)) are formed, respectively. By using the ITO in which an oxygen concentration is increased and a concentration of electrons functioning as a carrier is reduced at the time of film formation, it is possible to lower a reflectance and increase a transmittance in a near infrared (NIR) region.

Instead of the ITO film, an ITiO film (Titanium-doped indium oxide) having high transmittance in the NIR region can be used as the transparent electrodes 22a and 22b. The ITiO film can decrease electron concentration to a moderate degree while keeping conductance sufficiently high because ITiO's electron mobility is larger than that of ITO. The ITiO film is suitable for some applications such as a pixelized VOA with a pulse width modulation (PWM) of more than 12 bits, because the driving waveform is degraded by the large time constant.

The homogeneous (parallel orientation) nematic layer without twist in a molecule arrangement is a typical example of the liquid crystal layer of the VOA. However, a twisted nematic (TN) layer can also be used as the liquid crystal layer. Such a TN layer approach exhibits higher wider bandwidth capability for the VOA, although it has slower response time because the layer thickness is greater than that of the homogeneous layer.

When an applied voltage to the pair of electrodes 22a and 22b included in the liquid crystal cell 10 is zero or small (OFF), a molecule major axis of the liquid crystals arranged between the pair of electrodes 22a and 22b is arranged in a direction along surfaces of the glass plates 21a and 21b. Then, an effective birefringence Δn (equivalent to an index of refraction affecting passing light depending on an inclination of the major axis of liquid crystal molecules) increases. When it is assumed that retardation Δnd (n is an index of refraction of the liquid crystals and d is a thickness of the cell) of the liquid crystal cell 10 is a half wavelength, as shown in FIG. 2, the liquid crystal cell 10 emits incident light by rotating a polarizing direction thereof by 90° (π/2). A transmission axis of the polarizing plate 11 transmits only light in the same polarizing direction as the polarizing direction of the incident light with respect to the liquid crystal cell 10. Therefore, in the state shown in FIG. 2, since a transmitting direction of the transmission axis of the reflection polarizing plate 11 and a polarizing direction of the light emitted from the liquid crystal cell 10 are different by 90°, the polarizing plate 11 reflects the light emitted from the liquid crystal cell 10 as shown in the figure. It is preferable that the light reflected by the reflection polarizing plate 11 is, for example, absorbed by an absorbent or the like.

Figure 4:
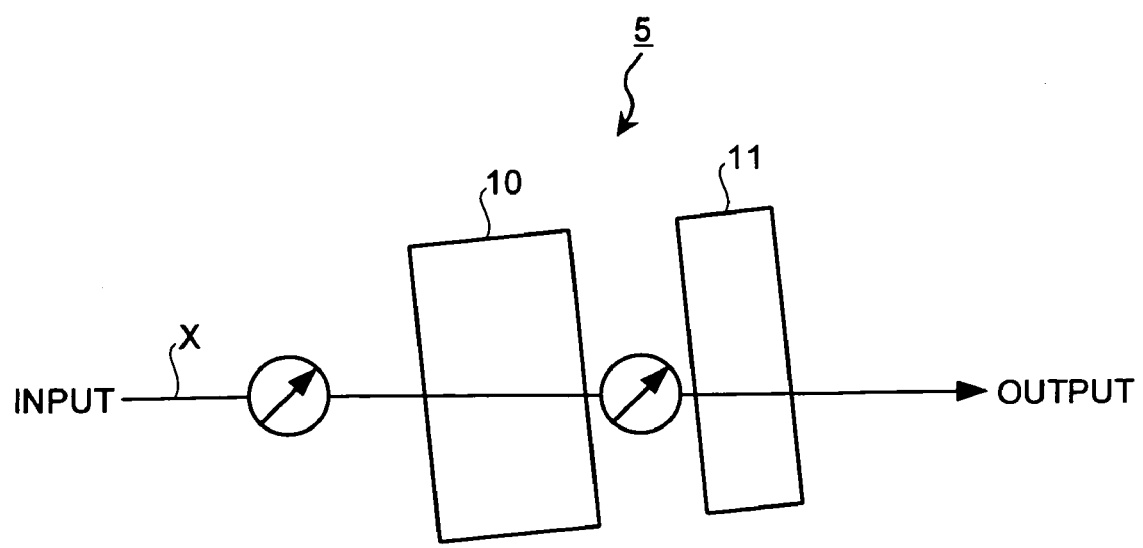
Figure 5:
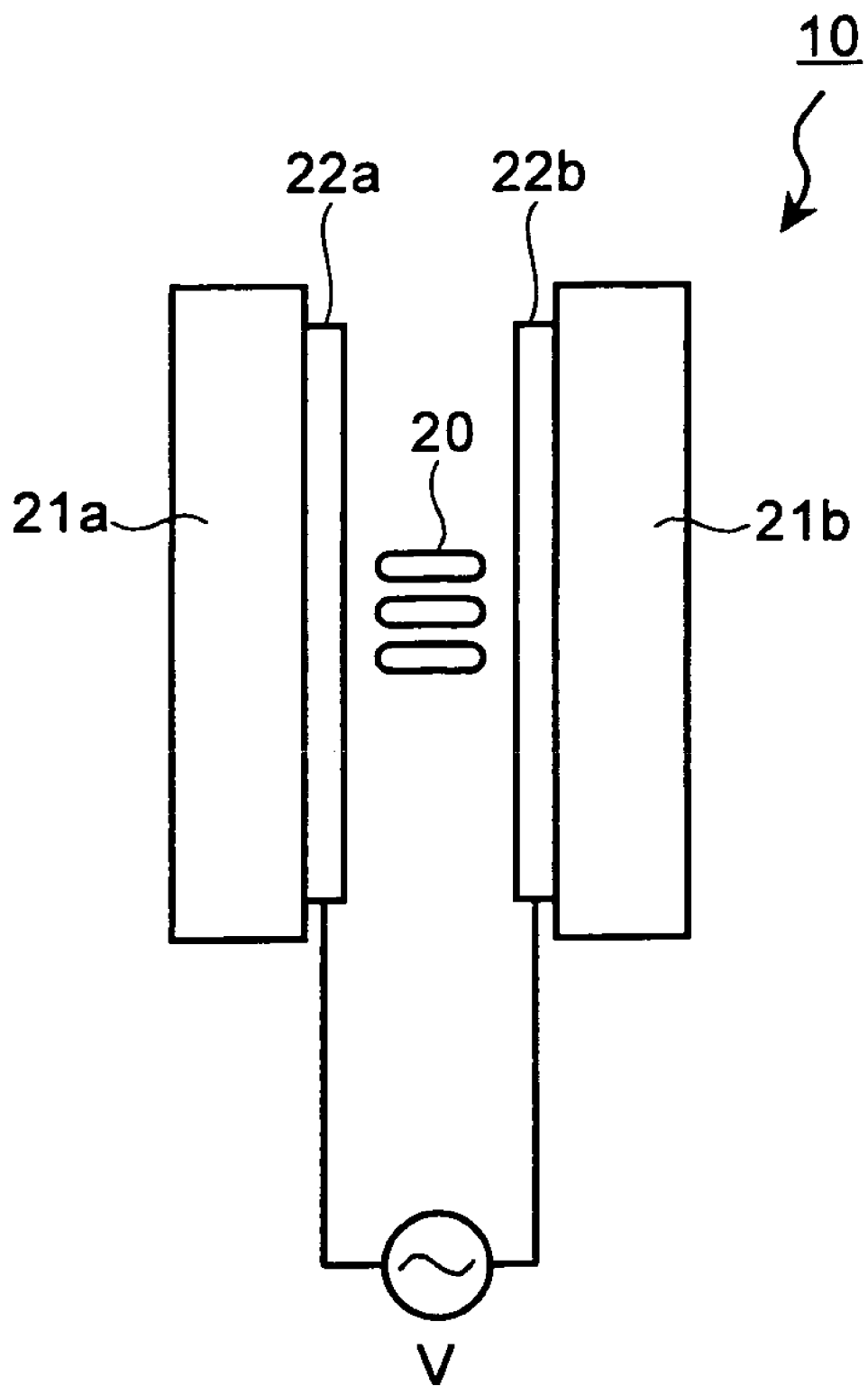
FIG. 5 is a diagram of an arrangement state of liquid crystals when a voltage is applied.

FIG. 4 is a diagram of a traveling state of light when the transmission VOA 5 is ON. FIG. 5 is a diagram of an arrangement state of liquid crystals when a voltage is applied. When a predetermined voltage V is applied to the pair of electrodes 22a and 22b of the liquid crystal cell 10 (ON), the arrangement of the molecular major axis of the liquid crystals arranged between the pair of electrodes changes to a direction perpendicular to the glass plates 21a and 21b along an electric field and the effective birefringence Δn approaches zero. Consequently, as shown in FIG. 4, the liquid crystal cell 10 emits incident light without rotating a polarizing direction thereof. Therefore, in the state shown in FIG. 4, since a transmitting direction of the transmission axis of the reflection polarizing plate 11 is identical with the polarizing direction of light emitted from the liquid crystal cell 10, the reflection polarizing plate 11 transmits the light emitted from the liquid crystal cell 10 as shown in the figure. The light transmitted through the reflection polarizing plate 11 is made incident on the optical fiber 8 shown in FIG. 1.

By continuously varying an applied voltage to the pair of electrodes 22a and 22b of the liquid crystal cell 10 from 0 to a predetermined voltage, it is possible to vary an emission state of light according to this voltage. Consequently, the LD module 1 is capable of varying output light intensity of emitted light using the transmission VOA 5.

The transmission VOA 5 explained with reference to FIGS. 2 and 3 is a normal close type VOA (which blocks light to prevent emission of the light when a voltage is not applied). By adopting the normal close type VOA, the LD module 1 can prevent emission of light to the liquid crystal cell 10 when a voltage is not applied. Thus, it is possible to prevent emission of a laser beam to the outside of the LD module 1 and improve safety like protection of user's eyes when the user handles the LD module 1. It is also possible to adopt a normal open type VOA (which emits light when a voltage is not applied) by changing a transmitting direction of the transmission axis of the polarizing plate 11.

In the structure described above, the reflection polarizing plate is used as the polarizing plate 11. However, an absorption polarizing plate can be used. In the case of the absorption polarizing plate 11, when a polarizing direction of incident light is identical with a set polarizing direction in which light is absorbed, the polarizing plate 11 absorbs this incident light and transmits incident light in a polarizing direction different from the polarizing direction in which light is absorbed.

It is possible to assemble the LD module 1 with a light polarizing direction set inside the housing 2 and define a polarizing direction of light emitted from the LD module 1. The isolator 7 and the transmission VOA 5, which are members for changing a polarizing direction of light emitted from the LD 4, only have to be fixed to the housing 2 with an arrangement thereof set. Thus, it is possible to align polarization states easily. If the structure for arranging the transmission VOA 5 in the LD module 1 in this way, it is unnecessary provide an optical member like a lens for aligning polarization states on the optical axis of the housing 2 and it is possible to manufacture the LD module 1 with a minimum number of components and at low cost. In addition, for example, the transmission VOA 5 has a small thickness of about 2 millimeters with respect to the optical axis direction. Thus, the housing 2 is not increased in size and it is possible to attain a reduction in size of the LD module 1 having an optical attenuation function. Note that, since the transmission VOA 5 does not require an electromagnet or the like for applying a magnetic field, a problem like an increase in optical path length due to a space or the like for arranging the electromagnet is not caused.

In addition, an additional polarizing plate can be arranged in front of the liquid crystal cell 10. This structure has a wider tolerance in alignment of the optical system of the LD module 1.

The transmission VOA 5 having the structure described above can have a phase compensating plate. Since the phase compensating plate compensates for residual birefringence of the liquid crystal cell 10, the phase compensating plate only has to be joined to a front surface (a light incidence side) of the absorption or reflection polarizing plate 11 or a light incidence side of the liquid crystal cell 10 by adhesion. At present, in a state in which the phase compensating plate is not provided, the transmission VOA 5 having the structure described above has a dynamic range of −26 decibels to −40 decibels. When the phase compensating plate is provided, an insertion loss (IL) is equivalent to that at the time when the phase compensating plate is not provided, and the dynamic range is −30 decibels to −50 decibels or more.

Next, examples of a structure of optical components constituting the LD module 1 will be explained. FIGS. 6A, 6B, 6C, and 6D are tables of examples of a structure of the LD module, respectively. A horizontal axis of each of the tables is the optical axis direction shown in FIG. 1. On the horizontal axis, a light source is set as "a", and "b" to "g" indicate an arrangement of optical components along the optical axis direction. In all the examples of the structure shown in FIG. 6A, an LD is used as the light source. For example, in an example A of the structure, the light source "a" is the LD 4 shown in FIG. 1 and the coupling lens 6, the polarization dependent isolator 7, the transmission VOA 5 (the liquid crystal cell 10 shown in FIG. 2 and the absorption polarizing plate 11 (e.g., Polarcore manufactured by Corning Incorporated) shown in FIG. 2), and the optical fiber 8 of a silica single mode fiber (SMF) are arranged in order on the light emission side of the LD 4. In an example B of the structure, a silica polarization-maintaining single mode optical fiber (PMF) is used as the optical fiber 8 at the final stage.

In an example C of the structure, the light source "a" is the LD 4 shown in FIG. 1 and the polarization dependent isolator 7 is directly arranged on the light emission side of the LD 4 without providing the coupling lens 6. The transmission VOA 5 (the liquid crystal cell 10 and the absorption polarizing plate 11 shown in FIG. 2), a fiber collimator (functioning as a lens) provided at a tip of the SMF used as the optical fiber 8, and the optical fiber 8 of the SMF are arranged at post-stages of the polarization dependent isolator 7.

In an example D of the structure, the polarizing plate 11, which constitutes the transmission VOA 5, used in the example A of the structure is replaced with a reflection polarizing plate (e.g., reflection polarizing element manufactured by Photonics Lattice Inc.). Similarly, in an example E of the structure, the polarizing plate 11, which constitutes the transmission VOA 5, used in the example C of the structure is replaced with a reflection polarizing plate.

Figure 6B:
FIG. 6B is a table of other examples of a structure of the LD module.

In an example F shown in FIG. 6B, the transmission VOA 5 and the isolator 7 in the example A of the structure are interchanged. In this way, the transmission VOA 5 can be arranged at a pre-stage of the isolator 7.

In an example G of the structure shown in FIG. 6C, the optical fiber 8 of the SMF arranged at the final stage in the example F of the structure is replaced with a lens and the optical fiber 8 of the SMF. In an example H of the structure shown in FIG. 6D, the transmission VOA 5 (the liquid crystal cell 10 and the absorption polarizing plate 11 shown in FIG. 12) is directly provided without providing the coupling lens 6 at the pre-stage in the example G of the structure, and the lens at the final stage in the example G of the structure is replaced with a fiber collimator of the optical fiber 8 of the SMF. In all the combinations using the edge-emitting LD, a structure without the isolator 7 is possible as long as return light to the edge-emitting LD can be reduced sufficiently. If the isolator 7 is removed in this way, in particular, the number of components is reduced to contribute to a reduction in cost.

FIGS. 7A, 7B, 7C, and 7D are tables showing examples of another structure of the LD module. A horizontal axis of each of the tables is the optical axis direction shown in FIG. 1. On the horizontal axis, a light source is set as "a", and "b" to "g" indicate an arrangement of optical components along the optical axis direction. In all the examples of the structure shown in FIGS. 7A to 7D, a vertical cavity surface emitting laser (VCSEL) is used as the light source "a" instead of the edge-emitting LD. For example, in an example I of the structure shown in FIG. 7A, the coupling lens 6, the polarization dependent isolator 7, the transmission VOA 5 (the liquid crystal cell 10 and the absorption polarizing plate 11 shown in FIG. 2), and the optical fiber 8 of the SMF are arranged in order on a light emission side of the VCSEL. In an example J of the structure, a polarization-maintaining single mode optical fiber (PMF) is used as the optical fiber 8 provided at the final stage.

In an example K of the structure, the light source "a" is a VCSEL and the coupling lens 6 and the polarization dependent isolator 7 are arranged in order on a light emission side of the VCSEL. The transmission VOA 5, a fiber collimator (functioning as a lens) provided at the tip of the optical fiber 8 of the SMF, and the optical fiber 8 of the SMF are arranged at a post-stage of the polarization dependent isolator 7.

In an example L of the structure, the polarizing plate 11 constituting the transmission VOA 5 used in the example I of the structure is replaced with a reflection polarizing plate. Similarly, in an example M of the structure, the polarizing plate 11 constituting the transmission VOA 5 used in the example K of the structure is replaced with a reflection polarizing plate.

In an example N of the structure shown in FIG. 7B, the polarizing plate 11 constituting the transmission VOA 5 is arranged in the front and the rear of the liquid crystal cell 10 without using the isolator 7. In this example N of the structure, the absorption or reflection polarizing plate 11 is arranged on the light incidence side of the liquid crystal cell 10 and the absorption polarizing plate 11 is arranged on the light emission side of the liquid crystal cell 10. Similarly, in an example O of the structure, the polarizing plate 11 constituting the transmission VOA 5 is arranged in the front and the rear of the liquid crystal cell 10 without using the isolator 7. In this example O of the structure, the absorption or reflection polarizing plate 11 is arranged on the light incidence side of the liquid crystal cell 10 and the reflection polarizing plate 11 is arranged on the light emission side of the liquid crystal cell 10. It is possible not to provide the polarizing plate 11 on the light incidence side of the liquid crystal cell 10.

In an example P of the structure shown in FIG. 7C, the SMF arranged at the final stage in the example N of the structure is replaced with the optical fiber 8 of a multi-mode fiber (MMF). In an example Q of the structure shown in FIG. 7D, the transmission VOA 5 (the liquid crystal cell 10 and the absorption polarizing plate 11 shown in FIG. 2) is directly arranged without providing the coupling lens 6 in the pre-stage in the example P of the structure. When the multi-mode fiber is used as the optical fiber 8 in this way, it is also possible not to provide a lens on the optical axis.

As explained the embodiments, it is possible to arrange the transmission VOA 5 in any section on the optical axis between the LD 4 and the optical fiber 8. In this case, it is possible to arrange the transmission VOA 5 in an arbitrary section simply by aligning polarizing directions of the isolator 7 and the transmission VOA 5.

Incidentally, when the absorption polarizing plate 11 is used in the transmission VOA 5, the absorption polarizing plate 11 adhered to the liquid crystal cell 10 shown in FIG. 2 can be adhered to the housing 2 shown in FIG. 1. Consequently, it is possible to radiate heat, which is generated when the absorption polarizing plate 11 absorbs light, to the housing 2 efficiently.

Figure 8:
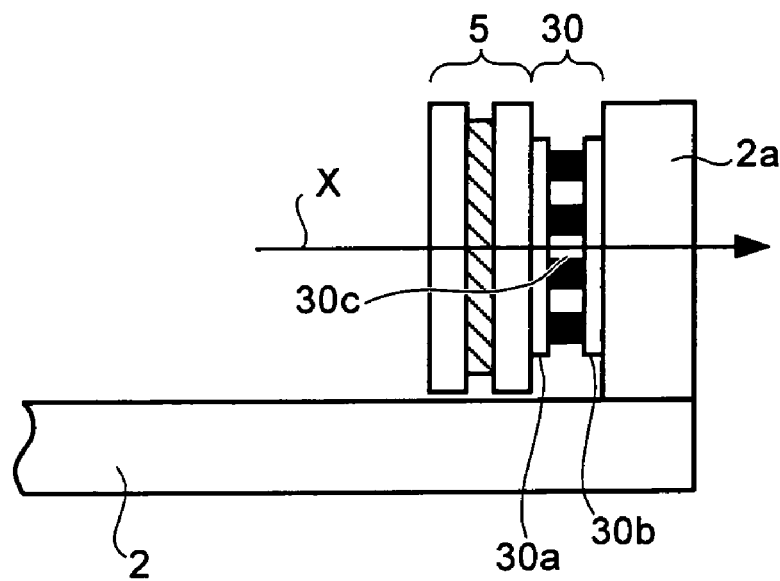
FIG. 8 is a side view of a heat radiating structure of the transmission VOA.
Figure 9:
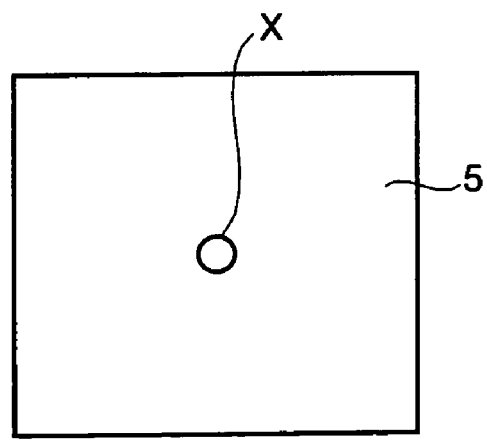
FIG. 9 is a front view of the heat radiating structure of the transmission VOA.

Next, a heat radiating structure of the transmission VOA 5 itself will be explained. FIG. 8 is a side view of the heat radiating structure of the transmission VOA 5 and FIG. 9 is a front view of the heat radiating structure of the transmission VOA 5. As shown in FIGS. 8 and 9, the transmission VOA 5 can be subjected to temperature regulation using a temperature regulating member. In an example shown in the figures, a Peltier element 30 is used as the temperature regulating member. One surface 30a of the Peltier element 30 is joined to a back (a light emission side) of the transmission VOA 5 and the other surface 30b of the Peltier element 30 is joined to a sidewall 2a of the housing 2. Since response speed of liquid crystals is low when, in particular, temperature is low, it is possible to reduce temperature dependency of the liquid crystals in the liquid crystal cell 10 (see FIG. 2) of the transmission VOA 5 by joining the surfaces of the Peltier element 30 in this way. Note that, in a part of the Peltier element 30 where the optical axis X passes, a gap 30c is formed to cause the optical axis X to pass through the gap 30c. In addition, if a heater is used instead of the Peltier element 30, it is possible to realize a reduction in cost.

Figure 10:
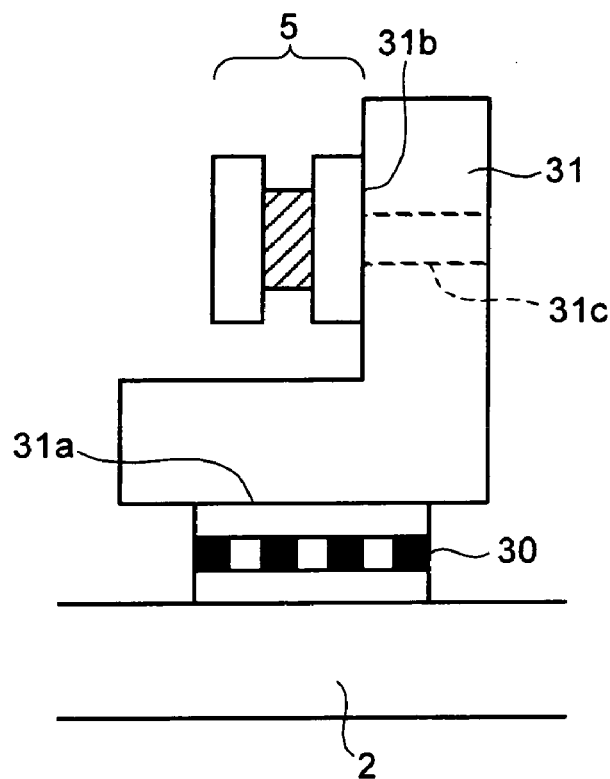
FIG. 10 is a side view of another heat radiating structure of the transmission VOA.
Figure 11:
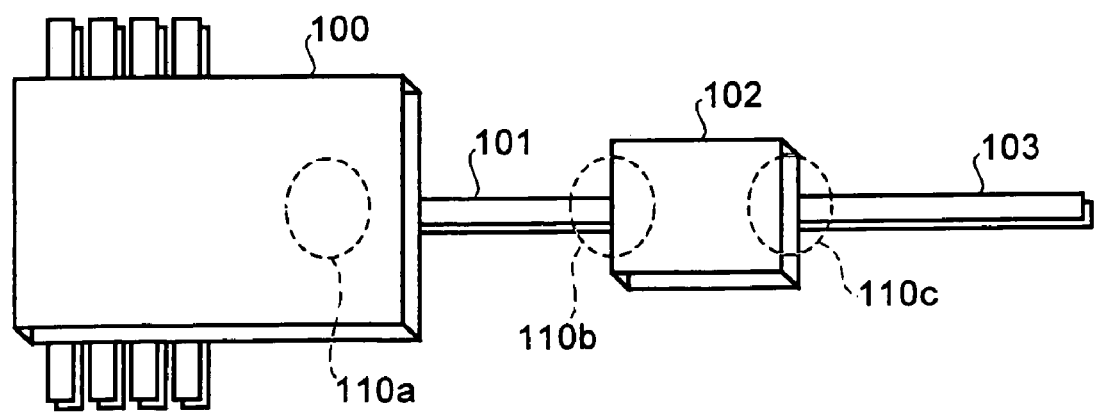
FIG. 11 is a diagram of a structure for adjusting output light intensity in a conventional technique.

FIG. 10 is a side view of another heat radiating structure of the transmission VOA 5. In the heat radiating structure, the Peltier element 30 shown in the figure (or a heater) is provided on the housing 2 as a temperature regulating member, a bottom surface 31a of a heat conduction plate 31 of substantially an L shape is placed on the Peltier element 30, and the transmission VOA 5 is joined to a side 31b of the heat conduction plate 31. In the heat conduction plate 31, a gap 31c is formed in a position where the optical axis X passes. When the transmission VOA 5 is constituted in this way, it is also possible to reduce temperature dependency of the liquid crystals in the liquid crystal cell 10 of the transmission VOA 5.

According to the embodiment explained above, as shown in FIG. 1, the LD module 1 includes the LD 4 that emits light of a predetermined wavelength, the optical fiber 8 that propagates the light emitted from the LD 4, and the transmission VOA 5 that is arranged between the LD 4 and the optical fiber 8 and attenuates light intensity. The transmission VOA 5 is arranged to be inserted between the LD 4 and the optical fiber 8. Consequently, it is possible to minimize the number of components of the LD module 1 and vary output light intensity without requiring deviation of an oscillation wavelength and complicated control.

As shown in FIG. 2, the transmission VOA 5 includes the nematic liquid crystal cell 10 and the absorption or reflection polarizing plate 11. Consequently, it is possible to easily vary light intensity with voltage control to the liquid crystal cell 10. This nematic liquid crystal cell 10 includes liquid crystals of a homogeneous orientation and has a direction of orientation made variable in a uniaxial direction. Consequently, it is possible to cause the nematic liquid crystal cell 10 to function as a uniaxial variable wavelength plate to vary light intensity easily.

The transmission VOA 5 only has to be inserted between the LD 4 and the optical fiber 8. Therefore, for example, it is possible to arrange the transmission VOA 5 immediately before the optical fiber 8 on the optical axis or arrange the isolator 7 on the optical axis and arrange the transmission VOA 5 immediately behind the isolator 7. It is also possible to arrange an optical system, which optically couples light emitted from the LD 4 to the incidence end of the optical fiber 8, on the optical axis. For example, on the optical axis of light emitted from the LD 4, an optical system such as the coupling lens 6 for optical coupling, the isolator 7, and the transmission VOA 5 can be arranged in order along the optical axis to optically couple the emitted light from the transmission VOA 5 to the incidence end 8a of the optical fiber 8.

Note that it is possible to use a single mode or a polarization-maintaining silica optical fiber as the optical fiber 8.

According to the laser diode module according to the invention, there is an effect that it is possible to reduce the number of optical components to realize a reduction in size of the LD module and it is possible to adjust a light intensity of output light while keeping a stable oscillation wavelength.

Although the invention has been described with respect to a specific embodiment for a complete and clear disclosure, the appended claims are not to be thus limited but are to be construed as embodying all modifications and alternative constructions that may occur to one skilled in the art which fairly fall within the basic teaching herein set forth.

The present document incorporates by reference the entire contents of Japanese priority document, 2004-40500 filed in Japan on Feb. 17, 2004.

What is claimed is:

1. A laser diode module comprising:
    a housing, said housing containing:
    a laser diode that emits light of a predetermined wavelength;
    a liquid crystal variable optical attenuator that comprises any one of an absorption polarizing plate and a reflection polarizing plate, and attenuates intensity of the light emitted; and
    an optical fiber that propagates the light attenuated, wherein
    the liquid crystal variable optical attenuator is arranged within said housing on an optical axis of the light and between the laser diode and the optical fiber.

2. The laser diode module according to claim 1, wherein the liquid crystal variable optical attenuator further comprises a nematic liquid crystal cell.

3. The laser diode module according to claim 2, wherein the nematic liquid crystal cell is a uniaxial variable wavelength plate and has a direction of orientation made variable in a uniaxial direction.

4. The laser diode module according to claim 1, wherein the liquid crystal variable optical attenuator is arranged immediately before the optical fiber.

5. The laser diode module according to claim 1, further comprising an isolator that is arranged on the optical axis and immediately before the liquid crystal variable optical attenuator.

6. The laser diode module according to claim 1, further comprising an optical system that is arranged on the optical axis and optically couples the light emitted to an incidence end of the optical fiber.

7. The laser diode module according to claim 1, further comprising:
    an optical system that is arranged on the optical axis; and
    an isolator that is arranged on the optical axis and between the optical system and the liquid crystal variable optical attenuator.

8. The laser diode module according to claim 1, further comprising:
    a first optical system that is arranged on the optical axis;
    an isolator that is arranged on the optical axis and between the first optical system and the liquid crystal variable optical attenuator; and
    a second optical system that is arranged on the optical axis and between the liquid crystal variable optical attenuator and the optical fiber.

9. The laser diode module according to claim 1, wherein a silica optical fiber is used as the optical fiber.

10. The laser diode module according to claim 9, wherein the silica optical fiber is a single mode fiber.

11. The laser diode module according to claim 9, wherein the silica optical fiber is a polarization-maintaining fiber.

12. The laser diode module according to claim 1, wherein a multi-mode fiber is used as the optical fiber.

13. The laser diode module according to claim 1, wherein the liquid crystal variable optical attenuator includes a temperature regulating member for regulating temperature of the liquid crystal variable optical attenuator.

14. The laser diode module according to claim 13, further comprising a heat conduction plate that is arranged on any one of an incidence side and an emission side of the liquid crystal variable optical attenuator, wherein the temperature regulating member is arranged on the heat conduction plate.

15. The laser diode module according to claim 13, wherein the temperature regulating member is any one of a Peltier element and a heater.

* * * * *